(12) United States Patent
Yamada et al.

(10) Patent No.: US 11,955,799 B2
(45) Date of Patent: Apr. 9, 2024

(54) SUPPLY-AND-DEMAND MANAGEMENT APPARATUS, COMPUTER READABLE STORAGE MEDIUM, AND SUPPLY-AND-DEMAND MANAGEMENT METHOD

(71) Applicant: HONDA MOTOR CO., LTD., Tokyo (JP)

(72) Inventors: Takayuki Yamada, Saitama (JP); Koichiro Takemasa, Saitama (JP); Kazuyoshi Miyajima, Saitama (JP); Keiichi Takikawa, Tokyo (JP); Yuiko Koga, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 475 days.

(21) Appl. No.: 17/010,853

(22) Filed: Sep. 3, 2020

(65) Prior Publication Data
US 2021/0006071 A1    Jan. 7, 2021

Related U.S. Application Data

(63) Continuation of application No. PCT/JP2019/000624, filed on Jan. 11, 2019.

(30) Foreign Application Priority Data

Mar. 7, 2018    (JP) ................................ 2018-041346

(51) Int. Cl.
*H02J 3/14*      (2006.01)
*G06Q 30/0208*    (2023.01)
(Continued)

(52) U.S. Cl.
CPC .......... *H02J 3/144* (2020.01); *G06Q 30/0208* (2013.01); *G06Q 50/06* (2013.01); *H02J 3/008* (2013.01)

(58) Field of Classification Search
CPC ...... H02J 3/144; H02J 3/008; G06Q 30/0208; G06Q 50/06; Y02E 40/70; Y04S 10/12; Y04S 10/50
See application file for complete search history.

(56) References Cited

U.S. PATENT DOCUMENTS 10,535,999 B2    1/2020   Hidaka
2010/0138066 A1*   6/2010   Kong ................. G06Q 30/0601
                                                   705/317
(Continued)

FOREIGN PATENT DOCUMENTS

JP    2003134672 A    5/2003
JP    2014233133 A    12/2014
(Continued)

OTHER PUBLICATIONS

Rendroyoko, Ignatius, and Ngapuli Irmea Sinisuka. "Residential customer demand response program in microgrid system: A survey literature." GEOMATE Journal 14.46 (2018): 8-14. (Year: 2018).*

(Continued)

*Primary Examiner* — Ziaul Karim

(57) ABSTRACT

Provided is a supply-and-demand management apparatus including: a result management unit that manages a power supply result indicating a result of power supplied among a plurality of customers of a community; and a deriving unit that derives, based on power supply results from a first customer to other customers from among the plurality of customers, an incentive to supply power from the first customer to a second customer from among the other customers.

11 Claims, 8 Drawing Sheets

(51) Int. Cl.
*G06Q 50/06* (2012.01)
*H02J 3/00* (2006.01)

(56) References Cited

U.S. PATENT DOCUMENTS

| | | | |
|---|---|---|---|
| 2010/0179704 A1* | 7/2010 | Ozog | H02J 7/35 |
| | | | 703/2 |
| 2010/0191487 A1* | 7/2010 | Rada | H02J 3/01 |
| | | | 707/E17.014 |
| 2012/0078687 A1* | 3/2012 | Ghosh | G06Q 30/0207 |
| | | | 705/14.1 |
| 2015/0066609 A1* | 3/2015 | Steele | G06Q 30/0207 |
| | | | 705/14.1 |
| 2015/0213564 A1* | 7/2015 | Ishida | G06Q 30/0204 |
| | | | 705/7.33 |
| 2016/0045841 A1* | 2/2016 | Kaplan | C01B 32/05 |
| | | | 429/49 |
| 2017/0256952 A1* | 9/2017 | Sugahara | H02J 7/0013 |
| 2021/0006071 A1* | 1/2021 | Yamada | G06Q 30/02 |
| 2022/0402383 A1* | 12/2022 | Nakamura | H02J 50/12 |
| 2023/0005256 A1* | 1/2023 | Kerzner | G08G 5/0069 |

FOREIGN PATENT DOCUMENTS

| | | |
|---|---|---|
| JP | 2017127086 A | 7/2017 |
| JP | 2018007364 A | 1/2018 |
| WO | 2016136263 A1 | 9/2016 |

OTHER PUBLICATIONS

Koirala, Binod Prasad, et al. "Energetic communities for community energy: A review of key issues and trends shaping integrated community energy systems." Renewable and Sustainable Energy Reviews 56 (2016): 722-744. (Year: 2016).*

Celik, Berk, et al. "Decentralized neighborhood energy management with coordinated smart home energy sharing." IEEE Transactions on Smart Grid 9.6 (2017): 6387-6397. (Year: 2017).*

International Preliminary Report on Patentability for International Application No. PCT/JP2019/000624, issued by the International Bureau of WIPO dated Sep. 8, 2020.

* cited by examiner

| 22 | | |
|---|---|---|
| TOTAL POWER AMOUNT | | 50kwh |
| POWER AMOUNT OF EACH HOUSE | A | 25kwh |
| | B | 0 |
| | C | 15kwh |
| | D | 5kwh |
| | E | 5kwh |

| SUPPLIED TO: | NUMBER OF POWER SUPPLIES | INCENTIVE FOR NEXT SUPPLY |
|---|---|---|
| B | 10 | 1 |
| C | 5 | 5 |
| D | 5 | 5 |
| E | 1 | 10 |

*FIG. 4*

SUPPLY-AND-DEMAND MANAGEMENT APPARATUS, COMPUTER READABLE STORAGE MEDIUM, AND SUPPLY-AND-DEMAND MANAGEMENT METHOD

The contents of the following Japanese patent application are incorporated herein by reference:
NO. 2018-041346 filed in JP on Mar. 7, 2018, and
NO. PCT/JP2019/000624 filed in WO on Jan. 11, 2019

BACKGROUND

1. Technical Field

The present invention relates to a supply-and-demand management apparatus, a computer readable storage medium, and a supply-and-demand management method.

2. Related Art

An energy distribution control system has been known in which an entity which is supplied with energy can supply its energy to another entity (for example, see Patent Document 1). In addition, a solar power generation system was known in which, if an imbalance of a distribution amount of power is detected, the system resolves the imbalance within a certain period (for example, see Patent Document 2).
Patent Document 1: Japanese Patent Application Publication No. 2014-233133
Patent Document 2: Japanese Patent Application Publication No. 2003-134672
In an off-grid CEMS (Community Energy Management System), power of the entire community is disconnected from the utility grid. Therefore, the community is required to accommodate the power consumption within the community. Even in a CEMS not disconnected from the utility grid, it is desirable that power is supplied within the community in accordance with a situation of power consumption of each household which configures the community. Each household which configures the community possesses a power supply-and-demand apparatus or other using a renewable energy, and a balance of a supply and demand is expected to be different depending on the household. Thus, a possible situation is that a certain household may have extra power while another certain household may be short of power. In this case, power supply from said one certain household may be directed exclusively to said another certain household while not directed to any other households which demand power within the same community.

BRIEF DESCRIPTION OF THE DRAWINGS

FIG. 2 schematically illustrates one example of the management table 22 managed by the operation management server 100.
FIG. 4 schematically illustrates one example of a management table 700 used by the operation management server 100 to manage the power supply result of a house of A.

DESCRIPTION OF EXEMPLARY EMBODIMENTS

Hereinafter, the present invention will be described through the embodiments of the invention. However, the embodiments described below are not to limit the claimed invention. In addition, all of the combinations of the features described in the embodiments are not necessarily required in the solution of the invention.

Figure 1:
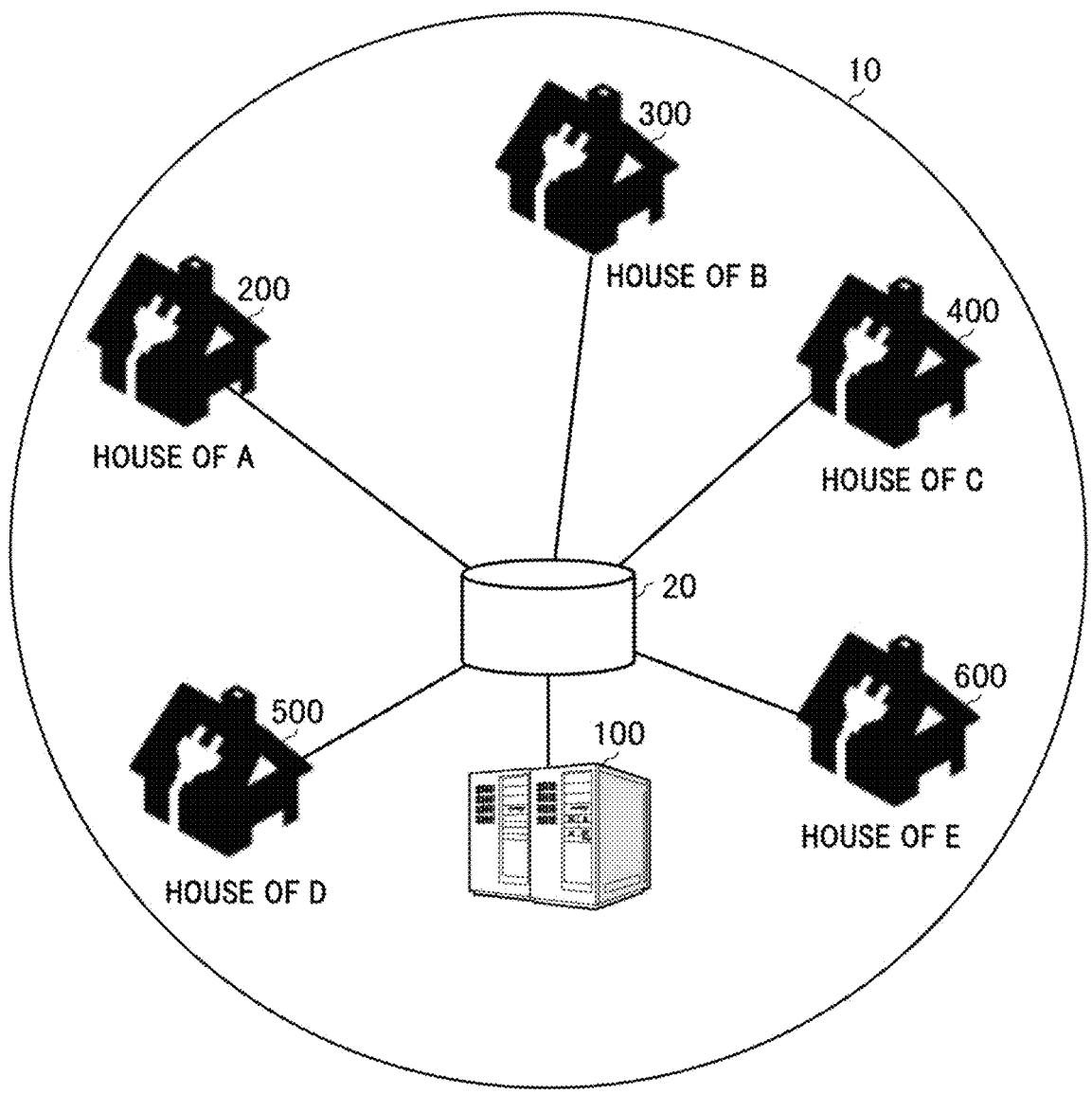
FIG. 1 schematically illustrates one example of a community 10.

FIG. 1 schematically illustrates one example of a community 10. The community 10 illustrated in FIG. 1 includes a customer 200, a customer 300, a customer 400, a customer 500, a customer 600, a shared battery 20, and an operation management server 100. The customer 200, the customer 300, the customer 400, the customer 500, and the customer 600 may be referred to as the house of A, a house of B, a house of C, a house of D, and a house of E, respectively. In addition, the customer 200, the customer 300, the customer 400, the customer 500, and the customer 600 may be referred to as the customers of the community 10, collectively. The customers of the community 10 and the operation management server 100 are connected via a communication network, but the illustration of the communication network is omitted in FIG. 1.

Here, provided is an exemplary case in which the community 10 is disconnected from the utility grid. The community 10 is constantly disconnected from the utility grid, for example That is, the community 10 may be a community such as what is called an off-grid CEMS. In addition, the community 10 may also be in a situation of being temporarily disconnected from the utility grid, although it is generally connected to the utility grid.

The customers of the community 10 possess power generation equipment and a battery. The customer stores power generated by the power generation equipment in the battery. A resident of the customer uses the power generated by the power generation equipment and the power stored in the battery in the daily life.

The customer can transmit to the shared battery 20 the power generated by the power generation equipment and the power stored in the battery. The customer can use the shared battery 20 as a backup means. For example, the resident of the customer transmits power to the shared battery 20 if the customer has surplus power, and receives power from the shared battery 20 if the customer is short of power.

The operation management server 100 manages a supply and demand of power within the community 10. The operation management server 100 may manage a share held by each of the customers of the community 10, in the power stored in the shared battery 20. For example, if power is transmitted from a customer to the shared battery 20, the operation management server 100 records the customer which transmits the power and the power transmission amount. Then, the operation management server 100 manages the total amount of the power stored in the shared battery 20 and the power amount transmitted by each customer, in the total power amount.

FIG. 2 schematically illustrates one example of the management table 22 managed by the operation management server 100. FIG. 2 illustrates an example in which the operation management server 100 uses the management table 22 to manage the total amount of the power stored in the shared battery 20 and the power amount of each customer. However, the management method is not limited thereto. The operation management server 100 may also manage, for example, the total amount of the power stored in the shared battery 20 and a ratio of the shares held by the respective customers.

The operation management server 100 receives a power transmission request from each customer via the communication network. The power transmission request may include identification information to identify the customer and a desired power transmission amount. If the operation management server 100 receives the power transmission request, it compares a share held by the customer identified by the identification information in the power of the shared battery 20, with the desired power transmission amount. If the share is greater than the desired power transmission amount, the desired power transmission amount is transmitted to the customer. Then, the operation management server 100 updates the management table 22 to subtract the power amount transmitted to the customer from the total power amount and the share of the customer. If the share is smaller than the desired power transmission amount, the operation management server 100 rejects to transmit power.

In the present embodiment, each customer can supply to other customers power corresponding to its own share in the power stored in the shared battery 20. For example, the house of A can supply to the house of B a part of or the entire 25 kwh stored in the shared battery 20. As a specific example, if a resident of the house of A allows to supply power of 10 kwh to the house of B, the operation management server 100 transmits to the house of B, in response to a request from a resident of the house of B, a part of or the entire share of the house of A of 10 kwh.

Here, the following situation may occur, for example. If the house of A is constantly abundant in power while the house of B and the house of E are constantly almost short of power, and a resident of the house of A and a resident of the house of B are in a close relationship while residents of the house of A and the house of E are not in a close relationship, power may be supplied from the house of A only to the house of B, while power may not be supplied from the house of A to the house of E, which could maintain the situation of the power shortage of the house of E unchanged. The operation management server 100 according to the present embodiment manages a power supply result indicating a result of power supplied among the customers in the community 10, and provides one customer with an incentive to supply power from the one customer to any other customer, based on the power supply result from the one customer to the other customer. The operation management server 100 may be one example of the supply-and-demand management apparatus.

For example, the operation management server 100 lowers an incentive to supply power from the house of A to the house of B as the number of power supplies from the house of A to the house of B is greater than the number of power supplies from the house of A to another customer. This allows, for example, an incentive to supply power from the house of A to the house of B to be lower, as the number of power supplies from the house of A to the house of B is greater than the number of power supplies from the house of A to the house of E. On the other hand, an incentive to supply power from the house of A to the house of E is higher, as the number of power supplies from the house of A to the house of E is smaller than the number of power supplies from the house of A to the house of B. This can prevent a situation in which power is supplied from the house of A only to the house of B, but not supplied to the house of E, and as a result, can prevent a situation in which the power shortage of the house of E remains unchanged.

Any reward can be used as an incentive. The incentive may be a non-monetary reward. For example, the incentive may be a point to use a shared property of the community 10. The shared property may be goods or other, or may also be a shared energy or other. For example, the incentive is a point to use a shared charging spot where a user can charge an item with power generated by the shared power generation equipment possessed by the community 10.

The financial resource of the community association of the community 10 may be available to finance the incentive, for example. The manager of the community 10 or other can control the incentive with the financial resource of the community association to prevent a part of the customers of the community 10 from suffering the power shortage. Note that the incentive may also be a monetary reward.

Figure 3:
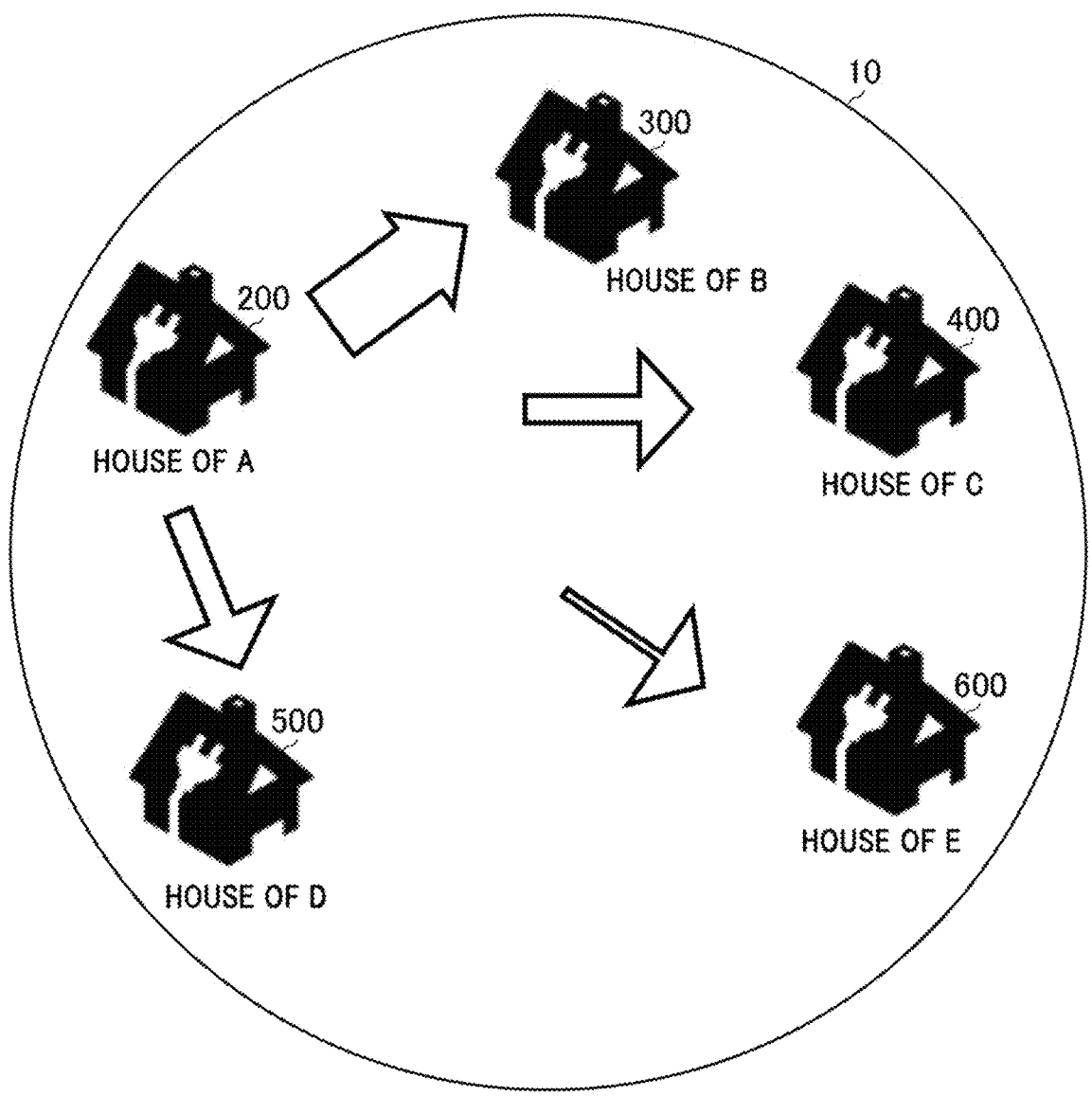
FIG. 3 schematically illustrates one example of a power supply result from a customer 200 to other customers.

FIG. 3 schematically illustrates one example of a power supply result from a customer 200 to other customers. FIG. 3 illustrates a larger power supply level by a wider arrow. In the example illustrated in FIG. 3, the supply level from the house of A to the house of B is the largest, the supply level from the house of A to the house of C and the supply level from the house of A to the house of D are the second largest, and the supply level from the house of A to the house of E is the smallest. The power supply level is the number of power supplies, for example. In addition, the power supply level is an amount of power supply, for example.

Under the situation of the power supply result of the house of A to the other customers as illustrated in FIG. 3, the operation management server 100 sets incentives to next supply power from the house of A to the other customers as follows: an incentive to supply from the house of A to the house of E to be the highest; an incentive to supply from the house of A to the house of C and an incentive to supply from the house of A to the house of D to be the next highest; and an incentive to supply from the house of A to the house of B to be the lowest.

FIG. 4 schematically illustrates one example of a management table 700 used by the operation management server 100 to manage the power supply result of the house of A. The management table 700 illustrated in FIG. 4 includes the number of power supplies from the house of A to another customer and an incentive to supply power from the house of A to another customer.

FIG. 4 illustrates an exemplary case in which the number of power supplies from the house of A to the house of B is 10, the number of power supplies to the house of C and the number of power supplies to the house of D are five, and the number of power supplies to the house of E is one. In addition, it illustrates an exemplary case in which an incentive to supply power from the house of A to the house of B is one, an incentive to supply power from the house of A to the house of C is five, an incentive to supply power from the house of A to the house of D is five, and an incentive to supply power from the house of A to the house of E is one. As illustrated in FIG. 4, the operation management server 100 may derive an incentive in accordance with an inverse ratio of the number of power supplies.

Figure 5:
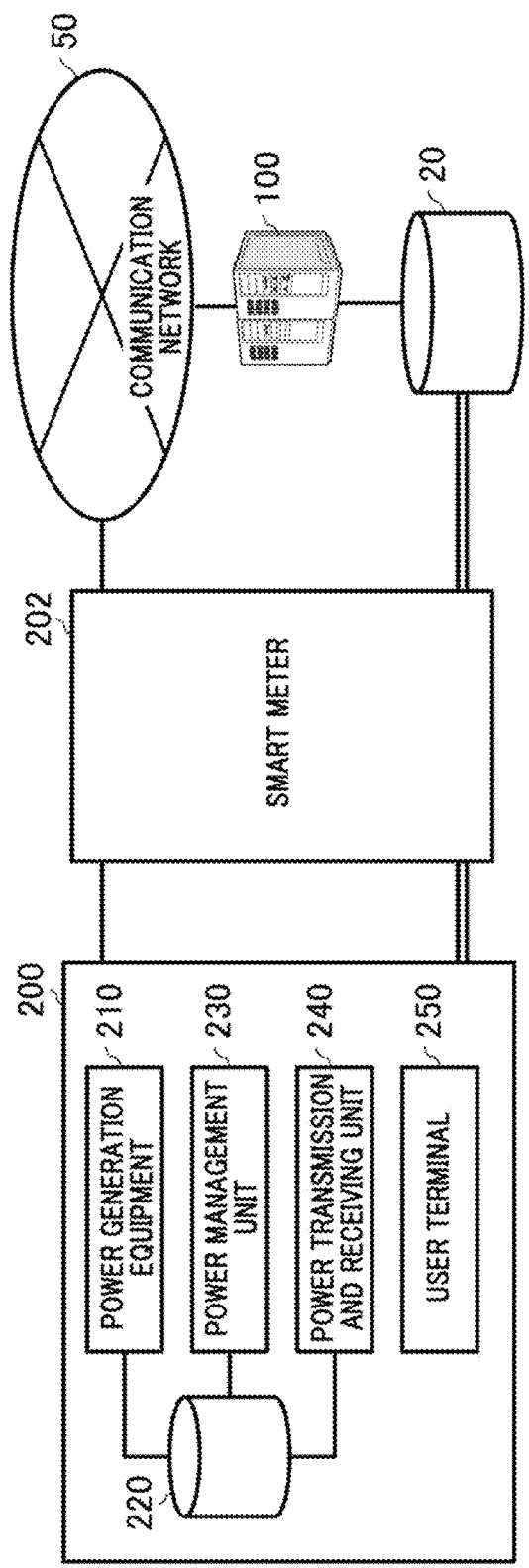
FIG. 5 schematically illustrates one example of the configuration of the customer 200.

FIG. 5 schematically illustrates one example of the configuration of the customer 200. In an example illustrated in FIG. 5, the customer 200 is connected to the shared battery 20 via a smart meter 202. In addition, the customer 200 is connected to a communication network 50 via the smart meter 202. The communication network 50 may include at least any of the Internet, a cellular network, and a dedicated network such as an LAN (Local Area Network).

The smart meter 202 manages a power supply-and-demand situation of the customer 200. The smart meter 202 may manage power transmitted from the customer 200 to the shared battery 20. The smart meter 202 may manage power received by the customer 200 from the shared battery 20. The smart meter 202 may also manage a demand response performed between the customer 200 and the other customers. The smart meter 202 manages, for example, a response rate of the demand response performed between the customer 200 and the other customers. The smart meter 202 may transmit the power supply-and-demand situation of the customer 200 to the operation management server 100 via the communication network 50.

The customer 200 possesses power generation equipment 210, a battery 220, a power management unit 230, a power transmission and receiving unit 240, and a user terminal 250. The power generation equipment 210 generates power, for example, by use of natural energy. The power generation equipment 210 is, for example, solar power generation equipment, wind power generation equipment, and water power generation equipment or other. The battery 220 stores power generated by the power generation equipment 210.

The power management unit 230 manages power of the customer 200. The power management unit 230 may manage power generated by the power generation equipment 210. The power management unit 230 may manage power stored in the battery 220.

The power transmission and receiving unit 240 transmits the power stored in the battery 220 to the outside. The power transmission and receiving unit 240 transmits, for example, the power stored in the battery 220 to the shared battery 20. In addition, the power transmission and receiving unit 240 receives power from the outside. The power transmission and receiving unit 240 receives power from the shared battery 20 and stores it in the battery 220, for example. The power management unit 230 may manage power transmitted and received by the power transmission and receiving unit 240.

The user terminal 250 performs a variety of power controls. For example, the user terminal 250 causes the power transmission and receiving unit 240 to transmit to the shared battery 20 the power stored in the battery 220, in accordance with an instruction of a resident of the customer 200. In addition, for example, the user terminal 250 transmits a power transmission request to the operation management server 100 to request to transmit power of the shared battery 20 to the customer 200, in accordance with an instruction of a resident of the customer 200. In addition, for example, the user terminal 250 transmits an instruction to the operation management server 100 to supply power of the shared battery 20 to another customer, in accordance with an instruction of a resident of the customer 200.

The user terminal 250 may be a PC (Personal Computer) provided in the customer 200, for example. In addition, the user terminal 250 may also be a mobile terminal such as a cell phone and a tablet terminal possessed by a resident of the customer 200.

The customer 300, the customer 400, the customer 500, and the customer 600 may have a configuration similar to that of the customer 200.

Figure 6:
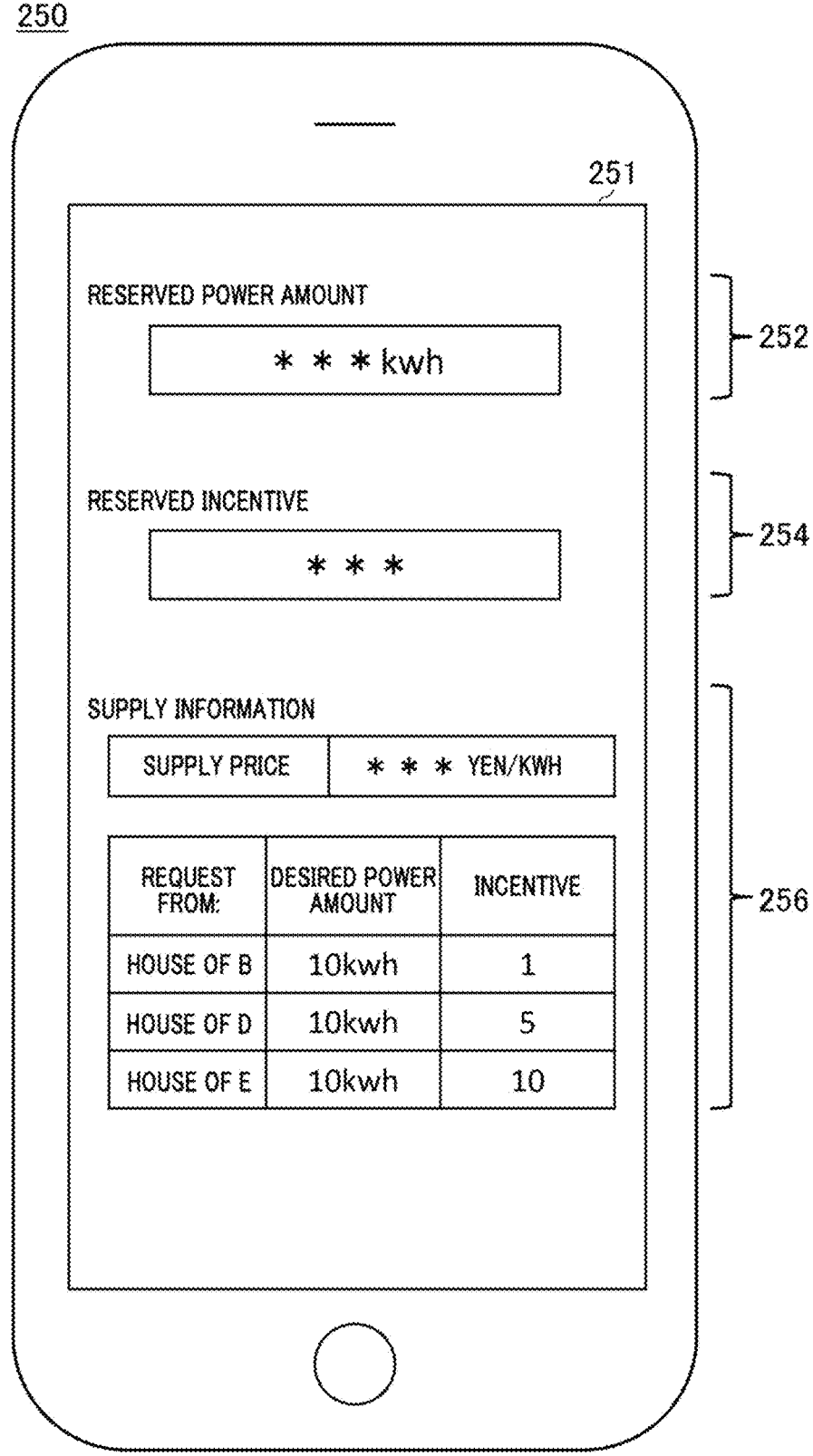
FIG. 6 schematically illustrates a display example 251 by the user terminal 250.

FIG. 6 schematically illustrates a display example 251 by the user terminal 250. The user terminal 250 receives display data from the operation management server 100 and displays in accordance with the display data, as illustrated in the display example 251.

The display example 251 illustrated in FIG. 6 includes a reserved power amount 252, a reserved incentive 254, and supply information 256. The reserved power amount 252 indicates a power amount reserved by the customer 200. The power amount reserved by the customer 200 indicates an amount of power corresponding to the share held by the customer 200 in the power stored in the shared battery 20. The reserved incentive 254 indicates an incentive reserved by the customer 200.

The supply information 256 includes a supply price of power at the moment. The supply price indicates a price per unit power amount, for example. In addition, the supply information 256 includes a customer which requests the house of A to supply power at the moment, the desired power amount, and an incentive to be provided to the house of A if it supplies power. The example illustrated in FIG. 6 indicates that: the house of B, the house of D, and the house of E request the house of A to supply power; each desired power amount is 10 kwh; an incentive to supply power to the house of B is one; an incentive to supply power to the house of D is five; and an incentive to supply power to the house of E is 10.

A resident of the house of A selects the house of E from the supply information 256 to allow power supply to the house of E, for example. The user terminal 250 notifies the operation management server 100 that the house of E is selected. The operation management server 100 manages, in accordance with the notification, 10 kwh of the share held by the house of A in the power stored in the shared battery 20 as a power amount which can be supplied to the house of E.

Figure 7:
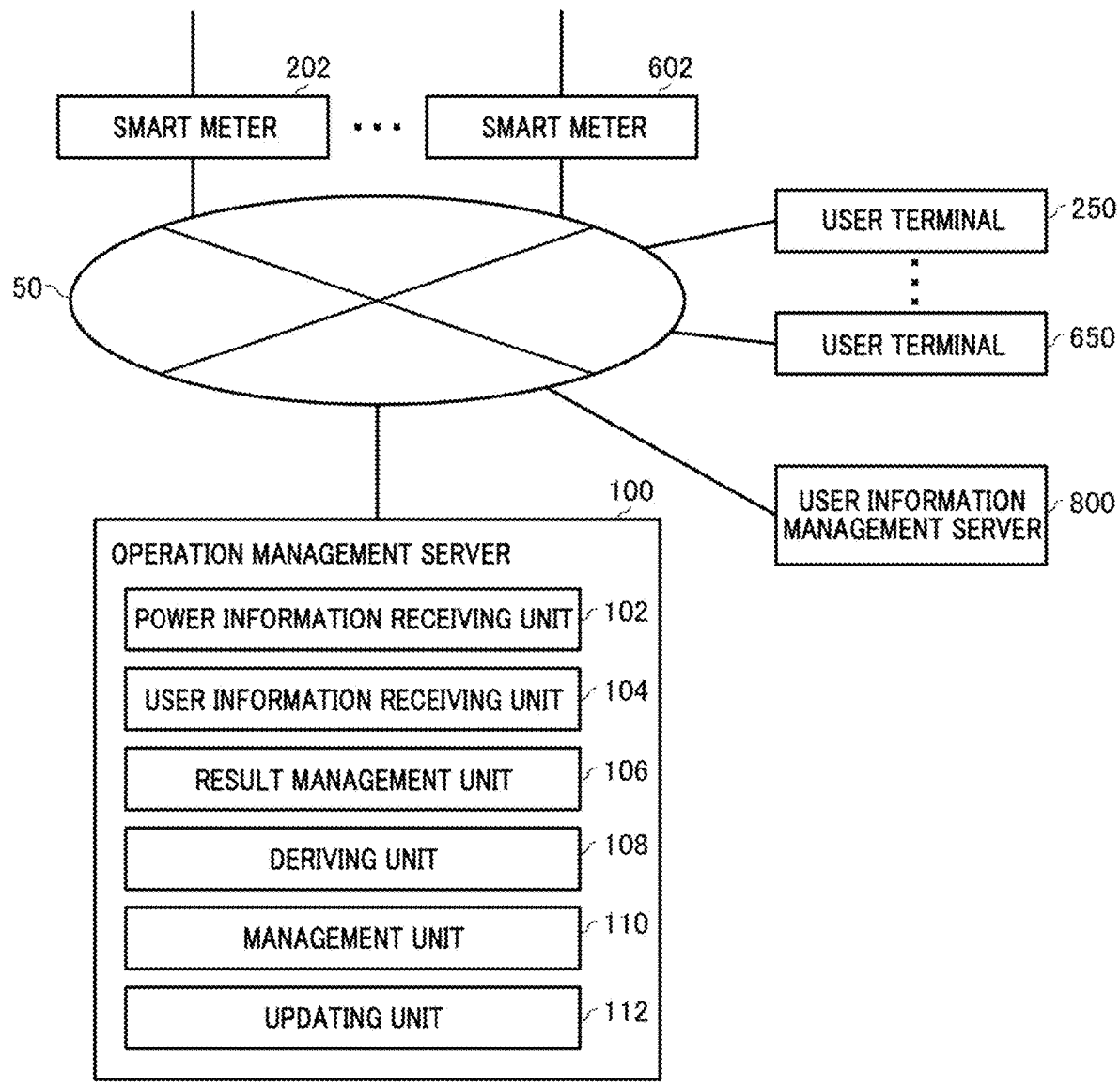
FIG. 7 schematically illustrates one example of the functional configuration of the operation management server 100.

FIG. 7 schematically illustrates one example of the functional configuration of the operation management server 100. The operation management server 100 includes a power information receiving unit 102, a user information receiving unit 104, a result management unit 106, a deriving unit 108, a management unit 110, and an updating unit 112.

The power information receiving unit 102 receives power information of the customer of the community 10. The power information receiving unit 102 receives the power information which indicates a power supply-and-demand situation of the customer 200 from the smart meter 202 of the customer 200, for example. In addition, the power information receiving unit 102 receives the power information which indicates a power supply-and-demand situation of the customer 300, the power information which indicates a power supply-and-demand situation of the customer 400, the power information which indicates a power supply-and-demand situation of the customer 500, and the power information which indicates a power supply-and-demand situation of the customer 600 from a smart meter 302 of the customer 300, a smart meter 402 of the customer 400, a smart meter 502 of the customer 500, and a smart meter 602 of the customer 600, respectively in the similar manner.

The user information receiving unit 104 receives user information of a user such as a resident of the customer of the community 10. The user information may be information which can identify the user. For example, the user information includes the name and address of the user, or other. The user information may also include an identification number which can identify the user. The user information receiving unit 104 receives the user information from the user information management server 800 which manages the user information of a plurality of users, for example.

The result management unit 106 manages a power supply result which indicates a result of power supplied among a plurality of customers of the community 10. The result management unit 106 may manage the power supply result in accordance with the power information received by the power information receiving unit 102.

The deriving unit 108 derives, based on the power supply result managed by the result management unit 106, an incentive to supply power among a plurality of customers of the community 10. The deriving unit 108 may perform a supply-and-demand management method including: a step of obtaining the power supply result managed by the result management unit 106; and a step of deriving, based on the power supply result from a first customer to another customer from among a plurality of customers, an incentive to supply power from the first customer to a second customer from among the other customers.

The deriving unit 108 derives, for example, a lower incentive as a power supply level from the first customer to the second customer from among the plurality of customers is higher than a power supply level from the first customer to another customer from among the plurality of customers. As a specific example, the deriving unit 108 may derive an incentive to supply power from the first customer to the second customer based on an inverse ratio of the power supply level from the first customer to the second customer.

The power supply level is the number of power supplies, for example. The deriving unit 108 may derive a lower incentive as the number of power supplies from the first customer to the second customer is greater than the number of power supplies from the first customer to another customer.

The power supply level is an amount of power supply, for example. The deriving unit 108 may derive a lower incentive as an amount of power supply from the first customer to the second customer is greater than an amount of power supply from the first customer to another customer.

The deriving unit 108 may also derive an incentive further based on a response rate of a demand response performed among a plurality of customers managed by the result management unit 106. For example, the deriving unit 108 derives the incentive by raising an incentive derived based on the power supply level to be higher as the response rate of the demand response is higher.

The management unit 110 manages an incentive corresponding to each of the customers of the community 10. The management unit 110 may transmit, in response to a request from a customer, notification data to notify an incentive corresponding to the customer. A resident of the customer can view the notification data to confirm the reserved incentive.

The updating unit 112 updates, if power is supplied among the customers of the community 10, an incentive of the customer managed by the management unit 110, in accordance with the incentive derived by the deriving unit 108.

Figure 8:
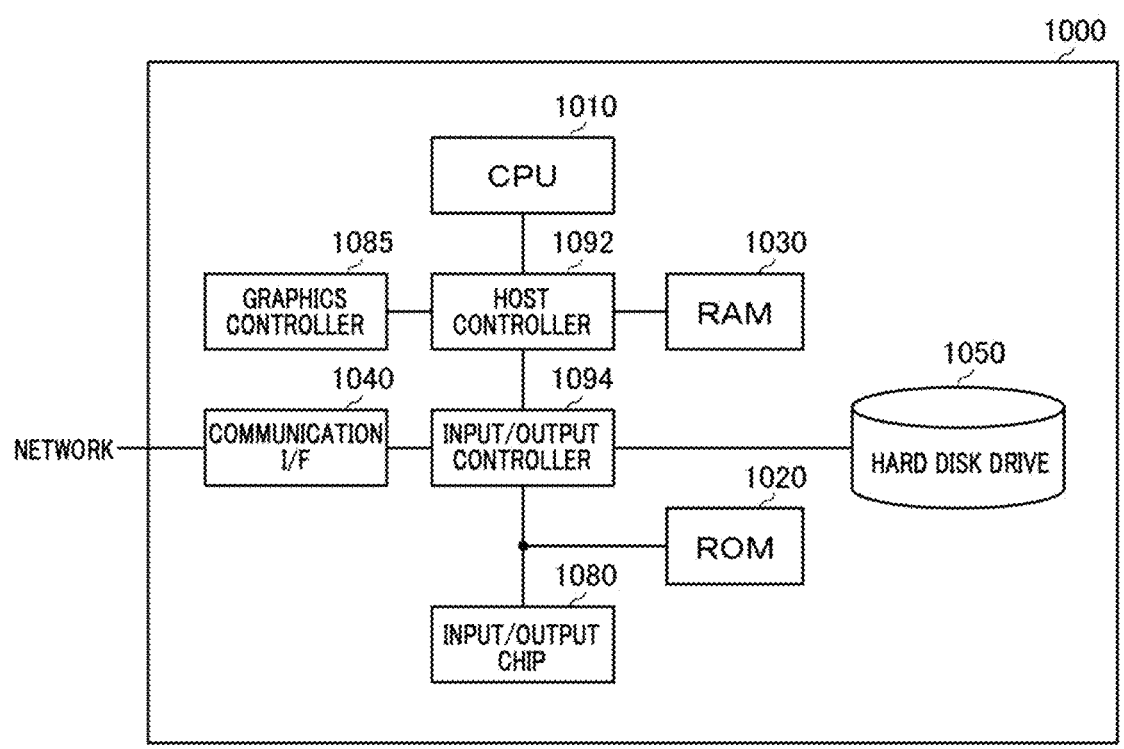
FIG. 8 schematically illustrates one example of the configuration of the hardware of the computer 1000 which functions as the operation management server 100.

FIG. 8 schematically illustrates one example of a computer 1000 which functions as the operation management server 100. The computer 1000 according to the present embodiment includes: a CPU-surrounding unit including a CPU 1010, an RAM 1030, and a graphics controller 1085, which are connected to one another by a host controller 1092; and an input/output unit including an ROM 1020, a communication I/F 1040, a hard disk drive 1050, and an input/output chip 1080, which are connected to the host controller 1092 by an input/output controller 1094.

The CPU 1010 operates based on programs stored in the ROM 1020 and the RAM 1030 to control each unit. The graphics controller 1085 obtains image data generated by the CPU 1010 or other on a frame buffer provided in the RAM 1030, and causes the image data to be displayed on a display. Alternatively, the graphics controller 1085 may include a frame buffer therein which stores the image data generated by the CPU 1010 or other.

The communication I/F 1040 communicates with other apparatuses via a wired or wireless network. In addition, the communication I/F 1040 functions as hardware to perform a communication. The hard disk drive 1050 stores a program and data to be used by the CPU 1010.

The ROM 1020 stores a boot program which is executed when the computer 1000 is booted and a program dependent on the hardware of the computer 1000, for example. The input/output chip 1080 connects a variety of input/output apparatuses to the input/output controller 1094, via a parallel port, a serial port, a keyboard port, a mouse port or other, for example.

A program provided to the hard disk drive 1050 via the RAM 1030 are provided by a user in a form of a recording medium such as an IC card, on which the program is stored. The program is read out of the recording medium, installed onto the hard disk drive 1050 via the RAM 1030, and executed in the CPU 1010.

The program installed on the computer 1000 to enable the computer 1000 to function as the operation management server 100 may act on the CPU 1010 and other components to enable the computer 1000 to function as each unit of the operation management server 100, respectively. Information processing described in these programs are read by the computer 1000 to function as the power information receiving unit 102, the user information receiving unit 104, the result management unit 106, the deriving unit 108, the management unit 110, and the updating unit 112, which are specific means of cooperation of software and a variety of hardware resources set forth above. Then, these specific means enable computation or processing of information in accordance with the intended use of the computer 1000 of the present embodiment to build up the specific operation management server 100 in accordance with the intended use.

In the embodiment set forth above, provided is an example in which the community 10 is disconnected from the utility grid. However, the community 10 may not be disconnected from the utility grid. In this case, the power transmission and receiving unit 240 of the customer 200 may transmit the power stored in the battery 220 to the utility grid. In addition, the power transmission and receiving unit 240 may receive power from the utility grid and store it in the battery 220.

While the embodiments of the present invention have been described, the technical scope of the invention is not limited to the above described embodiments. It is apparent to persons skilled in the art that a variety of alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: community, 20: shared battery, 22: management table, 50: communication network, 100: operation management server, 102: power information receiving unit, 104: user information receiving unit, 106: result management unit, 108: deriving unit, 110: management unit, 112: updating unit, 200: customer, 202: smart meter, 210: power generation equipment, 220: battery, 230: power management unit, 240: power transmission and receiving unit, 250: user terminal, 251: display example, 252: reserved power amount, 254: reserved incentive, 256: supply information, 300: customer, 302: smart meter, 400: customer, 402: smart meter, 500: customer, 502: smart meter, 600: customer, 602: smart meter, 700: management table, 800: user information management server, 1000: computer, 1010: CPU, 1020: ROM, 1030: RAM, 1040: communication I/F, 1050: hard disk drive, 1080: input/output chip, 1085: graphics controller, 1092: host controller, 1094: input/output controller

What is claimed is:

1. A supply-and-demand management system comprising:
at least one processor;
power generation equipment provided to each of a plurality of customers within a community;
a shared battery shared among the customers within the community;
a plurality of smart meters, each smart meter associated with a respective one of the power generation equipment of a customer;
a result management unit, implemented on the at least one processor, that manages a power supply result obtained from the smart meters indicating a result of power supplied by the power generation equipment among the plurality of customers of the community; and
a deriving unit, implemented on the at least one processor, that derives, based on power supply results from the power generation equipment of a first customer to other customers from among the plurality of customers, an incentive to supply power from the first customer to a second customer from among the other customers;
wherein
the deriving unit derives a lower incentive as a power supply level from the first customer to the second customer is higher than a power supply level to a customer other than the second customer, from among the other customers.

2. The supply-and-demand management system according to claim 1, wherein
the deriving unit derives an incentive to supply power from the first customer to the second customer based on an inverse ratio of the power supply level from the first customer to the second customer.

3. The supply-and-demand management system according to claim 1, wherein
the deriving unit derives a lower incentive as the number of power supplies from the first customer to the second customer is greater than the number of power supplies to a customer other than the second customer, from among the other customers.

4. The supply-and-demand management system according to claim 1, wherein
the deriving unit derives a lower incentive as an amount of power supply from the first customer to the second customer is greater than an amount of power supply to a customer other than the second customer, from among the other customers.

5. The supply-and-demand management system according to claim 1, wherein
the result management unit manages a response rate of a demand response performed among the plurality of customers, and
the deriving unit derives the incentive further based on the response rate.

6. The supply-and-demand management system according to claim 1, further comprising:
a management unit, implemented on the at least one processor, that manages an incentive corresponding to each of the plurality of customers; and
an updating unit, implemented on the at least one processor, that updates an incentive corresponding to the first customer in accordance with an incentive derived by the deriving unit.

7. The supply-and-demand management system according to claim 1, wherein the incentive is a non-monetary reward.

8. The supply-and-demand management system according to claim 7, wherein the incentive is a point to use a shared property of the community.

9. The supply-and-demand management system according to claim 1, wherein the community is an off-grid CEMS.

10. A system comprising:
power generation equipment provided to each of a plurality of customers within a community;
a shared battery shared among the customers within the community;
a plurality of smart meters, each smart meter associated with a respective one of the power generation equipment of a customer; and
a non-transitory computer readable storage medium storing a program for making a computer function as:
a result management unit, implemented on the computer, that manages a power supply result indicating a result of power obtained from the smart meters among a plurality of customers in a community provided with the power generation equipment; and
a deriving unit, implemented on the computer, that derives, based on power supply results from the power generation equipment of a first customer to other customers from among the plurality of customers, an incentive to supply power from the first customer to a second customer from among the other customers;
wherein
the deriving unit derives a lower incentive as a power supply level from the first customer to the second customer is higher than a power supply level to a customer other than the second customer, from among the other customers.

11. A supply-and-demand management method comprising:
providing power generation equipment to each of a plurality of customers within a community;
providing a shared battery shared among the customers within the community;
providing a plurality of smart meters, each smart meter associated with a respective one of the power generation equipment of a customer;
obtaining a power supply result from the smart meters indicating a result of power supplied by the power generation equipment among the plurality of customers of the community; and deriving, using at least one processor, based on power supply results from the power generation equipment of a first customer to other customers from among the plurality of customers, an incentive to supply power from the first customer to a second customer from among the other customers;

wherein the deriving step derives a lower incentive as a power supply level from the first customer to the second customer is higher than a power supply level to a customer other than the second customer, from among the other customers.

\* \* \* \* \*